May 1, 1934.  E. V. O'DANIEL  1,956,620
METHOD OF FUMIGATING GRAIN
Filed Dec. 26, 1931

Inventor
Edgar V. O'Daniel,
By S. C. Bierman
Attorney

Patented May 1, 1934

1,956,620

UNITED STATES PATENT OFFICE 1,956,620

METHOD OF FUMIGATING GRAIN

Edgar V. O'Daniel, Bronxville, N. Y., assignor to American Cyanamid Company, New York, N. Y., a corporation of Maine Application December 26, 1931, Serial No. 583,259

8 Claims. (Cl. 99—9)

This invention relates to fumigation, more particularly to a method for fumigating large masses of grain and the like.

Grain, after harvesting, is generally shipped in closed cars to central points where it is stored in elevators for considerable periods of time pending reshipment or use. In many instances the grain as it comes from the farm is more or less infested with various insect pests such as grain weevils, beetles, moths and the like. Often the infestation is rather slight at the time the grain is received in the elevator but after a period of storage the insects develop to such a degree as to seriously injure the quality thereof.

Since the activity of such insect pests constitutes a serious economic loss, it has been attempted to eradicate the insects from the grain with some effect, but the problem was not solved by these efforts. One of the commonest methods of combating insects in grain has been to fumigate the grain in the cars in which it is shipped, and this was generally done by pouring carbon disulphide into the grain and allowing the same to stand for a certain period of time. This method was not a success for a number of reasons, among which is the fact that carbon disulphide is not an extremely poisonous substance, is rather heavy, does not evaporate readily and it cannot be distributed into a mass of grain so as to reach all the portions thereof. Furthermore, the material is highly inflammable so that in treating a car of grain therewith, it is the practice to detach the car from a train and remove it to an isolated location, which entails considerable expense and effort. Because of the great fire risk involved, the insurance companies stipulate that grain insured by them shall not be fumigated with carbon disulphide.

As is well known, hydrocyanic acid is an excellent fumigant, being probably the most toxic substance known and the use thereof for the destruction of animal and insect pests has been widespread for many years. Attempts have been made to use hydrocyanic acid for the fumigation of grain and experiments have shown that all of the insects which infest grain can be quickly and completely eradicated by means thereof. It has been proposed to provide in the bottom of a bin or silo for the storage of grain a coil of pipe having many perforations therein and to spray liquid hydrocyanic acid into the bin filled with grain on the theory that the hydrocyanic acid will vaporize and thus kill all the insects. However, in practice it has been found that the method is not successful as the grain in the immediate vicinity of the perforated pipe absorbs practically all of the liquid hydrocyanic acid whereby a complete destruction of the insects is obtained only at the lower portion of the mass of grain and there is practically no kill of insects in the remainder of the mass.

To avoid the objectionable features of this proposed method, it has been suggested that gaseous or liquid hydrocyanic acid be introduced into a current of air which is circulated through the mass of grain by means of suitable pipe and pump connections at the top and bottom of the bin. This modification has been used with success but it requires a rather expensive apparatus and a modification of the ordinary construction of the elevator, which in many cases is prohibitive of the use thereof, both by reason of the added expense of installation and the impracticability thereof in elevators already in existence.

My invention is intended to utilize hydrocyanic acid as a fumigant for grain, it being among the objects thereof to provide a method which does not require the use of liquid or gaseous material, and the circulation thereof through the body of grain.

It is also among the objects of this invention to devise a method of fumigating grain which shall be simple, shall not require any modification of the structure of the elevator and which may be easily and readily adapted to the ordinary manipulation of grain in elevators, or in other places of temporary or long time storage.

In practicing my invention I utilize as a fumigant a material, preferably solid, which is or may become toxic to the insects contained in grain and more particularly I utilize a material which, in addition to being toxic in itself, is capable of liberating a toxic gas in concentrations which insure the destruction of insects in grain. Generally my method consists in moving the grain to a place of storage such as a railroad car or the bin of the ordinary grain elevator and as the grain is moving, and prior to or as it is flowing into the car or bin, I add thereto or mix therewith a predetermined amount of the said material so that a predetermined concentration of toxic gas may be liberated within the body of the grain in storage in the bin. I generally allow the grain to remain in storage for a suitable length of time to allow the toxic gas which is liberated to kill substantially all the insects and until all of the solid material has thereby become transformed into a harmless residue.

A material with which I have operated my method and which I have found is eminently adapted for use is calcium cyanide; which material has the property of reacting with moisture, even the small amounts present in the atmosphere, with a fairly rapid and complete liberation of substantially all the hydrocyanic acid combined therewith, in the form of a gas. I generally utilize a fine, granular form of this material as I have found that this form liberates its hydrocyanic acid content at such a rate that in a comparatively short time, say less than 24 hours, all of the toxic gas has been liberated and the residue has become harmless. I also find that this form of the material may be applied to the grain without any difficulties and without producing dust, thereby avoiding loss of hydrocyanic acid before the material becomes thoroughly mixed with the grain and also avoiding any danger of injury to the workmen.

In the accompanying drawing constituting a part hereof and in which like reference characters indicate like parts:

The ordinary elevator for the storage of grain and the like consists essentially of a series of bins or silos, generally of circular or rectangular section and made of reinforced concrete, the bins being probably 15 to 20 feet in diameter and 30 to 50 feet in height. They are usually arranged in two adjacent, parallel rows, on top of which is an endless conveyor belt and an arrangement known as a "tripper", whereby the grain may be first deposited on the belt by an auxiliary arrangement and then taken from the belt by the tripper arrangement and stored in any desired bin.

Figure 3:
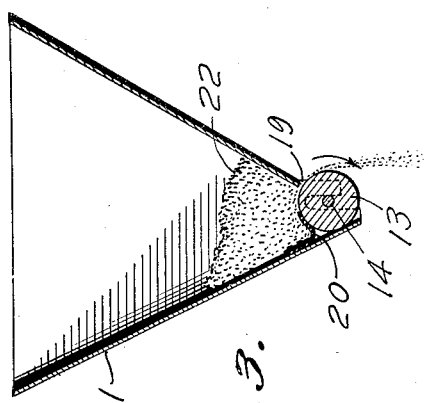
Fig. 3 is a cross sectional view thereof, taken along the line 3—3 of Fig. 2.
Figure 1:
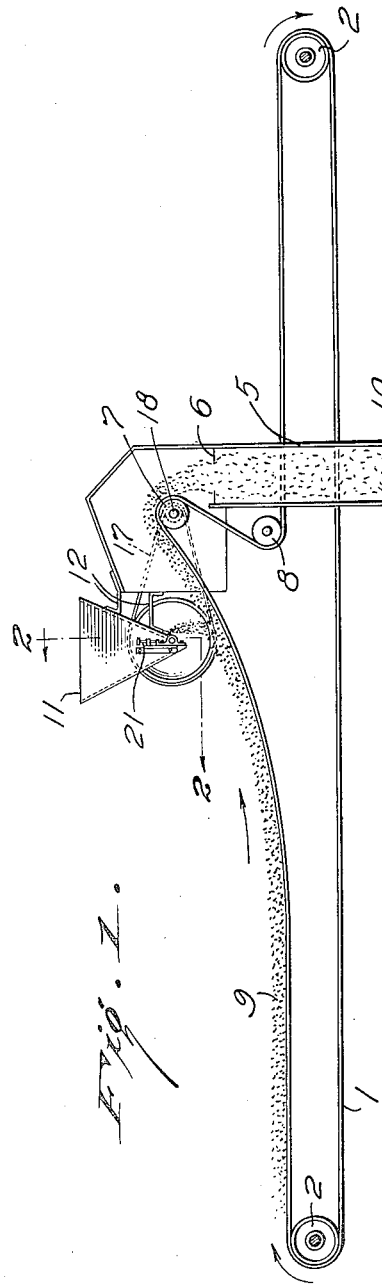
Fig. 1 is a side elevational view, more or less of a diagrammatic character, showing one manner of the application of my method to the fumigation of grain.
Figure 2:
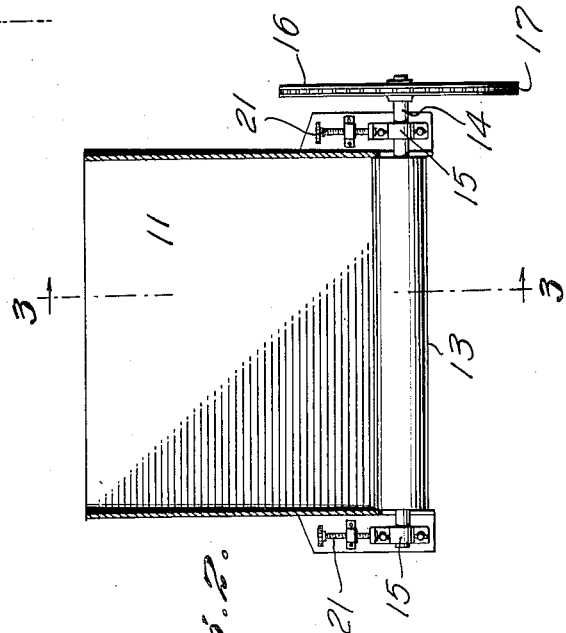
Fig. 2 is an enlarged, front view of the hopper arrangement for feeding the fumigant to the grain, taken along line 2—2 of Fig. 1.

Referring to Fig. 1 of the drawing, an endless belt or carrier 1 passes between rollers 2, one or more of which may be driven by a suitable power arrangement, not shown, the belt being located above and between two rows of bins 3 for the reception of grain. A housing 4 for the movable tripper arrangement is provided with two chutes 5, only one of which is shown in Fig. 1, for the purpose of guiding the grain to one or the other side of conveyor belt 1 and the respective set of bins 3. A butterfly or flap valve, not shown, is provided at point 6 to throw the grain issuing from the belt to one chute or the other and thus into the desired bin. Mounted in the housing 4 are two horizontal rollers 7 and 8, the belt 1 passing over the upper roller 7 and under the lower roller 8, the two rollers being in approximately vertical relation. Grain 9 is loaded on to the moving endless belt by any suitable means and from any desired source, such as by means of bucket conveyors from a car loaded with grain or from another bin. The grain passes in the direction of the arrow to roller 7 at which point it is thrown, by the action of gravity and the inertia of the moving mass, into the chute 5, issuing therefrom at point 10 and into a bin 3.

In order to fumigate the grain as it passes into the bin, I provide a hopper arrangement 11 which is secured in any suitable manner at points 12 to the housing 4. The hopper is of rectangular cross section and in the bottom thereof is a roller 13 secured on a shaft 14, the free ends of which are held in bearings 15 and the sprocket wheel 16 is secured thereto. The chain 17 passing over sprocket wheel 16 is driven by means of a sprocket wheel 18, secured to the shaft of roller 7. The roller 13 is placed in such relation to the rectangular opening in the bottom of the hopper that a narrow space or slot 19 remains for the feeding of the fumigating material, and a fabric or other guard 20 secured to the lower portion of the inside of the hopper forms a seal, preventing the loss of material at the rear of the roller 13. In order to vary the feed of material through the slot 19, the roller 13 is made adjustable by the provision of adjusting arrangements 21 connected to bearings 15 whereby the position of the roller 13, shaft 14 and the bearings 15 may be adjusted to vary the width of slot 19.

In the operation of my method I utilize a material 22 of the character above mentioned which is placed in the hopper 11, the said hopper and associated mechanism being so placed that material issuing from the slot 19 falls upon the endless belt 1 at a point which is just prior to the discharge of grain therefrom into the chute 5. The conveyor belt is caused to move at any desired speed and the grain 9 which is carried thereby from any suitable source, is carried past the fumigating mechanism and into the bin. The position of the roller 13 and thus the width of the slot 19 is adjusted to give the desired ratio of fumigant to grain and the rotation of sprocket wheel 16 by the rotation of roller 7 causes a feed of fumigant directly proportional to the amount of grain moving to the bin, regardless of variations in the speed of the endless belt. In its passage through the chute and into the bin, the fumigating material becomes more or less intimately mixed with the grain, but I have found an absolutely uniform mixture is not necessary because the toxic effect of the material is not primarily due to actual contact thereof with the insects but is due largely to the liberation of the gas therefrom which penetrates to a considerable distance away from the particle of material from which it is liberated. The grain is allowed to remain in the bin for a sufficient length of time so that practically all of the calcium cyanide has been decomposed, which may be about 24 hours, although it is advisable to retain the mass of grain in position in the bin for at least 48 hours and preferably for about one week in order to make certain that the liberated hydrocyanic acid will come in contact with all the insects.

The amount of fumigant which I have found necessary for the fumigation of grain varies with the character of the insects and the subdivision of the particles of fumigant, but in all cases the amount of fumigant is very small compared to the amount of grain fumigated. For practically all variations of conditions, an amount of calcium cyanide material, containing about 50% calcium cyanide, ranging from two pounds to sixty pounds for each one thousand bushels of grain fumigated, is sufficient. I have found that under ordinary conditions twenty pounds to thirty pounds of this cyanide are sufficient for the fumigation of one thousand bushels of wheat in 24 hours. The amount of material which may be used is dependent upon the length of treatment of the grain and it is obvious that less material is necessary to accomplish fumigation when the time of treatment is 48 hours instead of 24 hours. A considerable advantage residing in the use of this material by my method is that the residue which remains after the fumigation is complete is so small as to be negligible and the said residue is perfectly harmless. Experiments have shown that the flour made from wheat fumigated in the manner above described contains no residual hydrocyanic acid and cannot be distinguished from the flour made from wheat of the same character which has not been fumigated by my method. The slight amount of residue which remains in the grain may be removed very easily by transporting the grain to another bin and serrating or fanning the grain as it is being moved. However, this is unnecessary, first because the residue is so minute and is harmless, and then because the grain is ordinarily subjected to fanning operations prior to being ground to flour.

I have described my invention, setting forth a single embodiment thereof, but it is to be understood that the described apparatus and the exact method of applying the material to the grain may be varied to a considerable extent within the scope of my invention. For example, I have found that equally as good, if not better, results may be obtained by placing the hopper 11 and its associated mechanism so that the material 22 is discharged into the chute 5 instead of upon the belt 1. The driving mechanism may be of a different type than shown in the drawing and in some cases it is desirable to drive the feeding roller 13 by independent means, such as an electric motor. The 50% calcium cyanide which I have used and prefer to use is not the only material available for my purpose, as various other compositions, containing calcium cyanide or even compositions not of this character but which are capable of liberating a toxic gas and leaving either a residue which is harmless or may be separated from the grain, or no residue at all, may be substituted therefor. For instance, I may use a crude calcium cyanide made by the fusion of calcium cyanamid and carbon with a flux or a calcium cyanide made by the reaction between calcium carbide and hydrocyanic acid.

In carrying out my method, I may use a substance which is not a cyanide at all but which is solid, may be preserved, and which under the conditions described above, gasifies or vaporizes in whole or in part. Although I use a granular material because of advantages in the application thereof to the grain, I may utilize in place thereof a dust or a coarser material, such as flakes.

In place of the calcium cyanide, I have found that my method of disinfecting may be carried out using as the fumigant material a solid material such as kieselguhr having liquid hydrocyanic acid absorbed therein. Fumigation with these cyanide containing materials described is to be preferred because of the high toxicity of such materials as well as the fact that they leave no appreciable odor in the grain and are non-inflammable.

Where these objections are of no consequence, I may use as the fumigant in my method, a larger number of solid fumigants which are or become toxic, or which gasify or vaporize in whole or in part to give off toxic gases. The particular fumigant chosen is relatively immaterial since the process is adapted to utilize any of the fumigating materials falling within the defined group, the choice of the fumigant being dependent upon various factors having nothing to do with the operativeness of the method. Among the suitable fumigant materials may be mentioned paradichlorobenzene, monochloronaphthalene, trichloronaphthalene, naphthalene, naphthol, nicotine sulphate, tetrachlordinitroethane, lactonitriles, and other organic cyanogen compounds, and various liquid or gaseous materials absorbed in solid, granular absorbents (kieselguhr, etc.) such as bromine, chlorine, ammonia, phenols, carbon bisulphide, sulphur dioxide, formaldehyde, essential oils, carbon tetrachloride, chloropicrin, furfural, ethyl chloride, methyl ether, ethyl acetate, acetaldehyde, etc. This list of fumigants is by no means complete, but merely serves to illustrate the general applicability of the present process.

The invention described above is applicable not only to wheat but also to other grains, such as oats, rye, rice and the like and also to materials which may not be classed as grains but which are of the same consistency, are subject to deterioration by insects and which are or may be stored in bins, and all of these are included in the term "grain".

Many changes and variations other than those noted may be made in my method without departing from the principles set forth, the invention being limited only by the claims appended hereto.

This application is a continuation in part of my co-pending application Serial No. 105,399 filed April 29, 1926.

What I claim is:

1. A method of fumigating grain which comprises moving the same to a place of storage and adding thereto a predetermined amount of a solid material capable of liberating hydrocyanic acid in concentrations which are toxic to insect pests contained in said grain.

2. A method of fumigating grain which comprises moving the same to a place of storage, adding thereto a predetermined amount of a solid material capable of liberating hydrocyanic acid in concentrations which are toxic to insect pests contained in said grain and storing the grain for a sufficient length of time to allow the hydrocyanic acid to be liberated and to kill the pests.

3. A method of fumigating grain which comprises moving the same to a place of storage, adding thereto a predetermined amount of a solid material capable of liberating hydrocyanic acid in concentrations which are toxic to insect pests contained in said grain and storing the grain mixed with said material for at least 24 hours.

4. A method of fumigating grain which comprises moving the same to a place of storage, adding thereto a predetermined amount of a solid material capable of liberating hydrocyanic acid in concentrations which are toxic to insect pests contained in said grain, storing the grain for a sufficient length of time to allow the hydrocyanic acid to be liberated and to kill the pests and afterwards removing the spent material from the grain.

5. A method of fumigating grain which comprises moving the same to a place of storage and adding thereto an amount of a solid material capable of liberating hydrocyanic acid in concentrations which are toxic to insect pests contained in said grain, which is proportional to the speed of movement of said grain.

6. A method of fumigating grain which comprises moving the same to a place of storage and adding thereto a predetermined amount of calcium cyanide capable of liberating hydrocyanic acid in concentrations which are toxic to insect pests contained in said grain.

7. A method of fumigating grain which comprises moving the same to a place of storage and adding thereto calcium cyanide at the rate of 2 to 60 pounds per thousand bushels.

8. A method of fumigating grain which comprises moving the same to a place of storage and adding thereto calcium cyanide at the rate of about 20 to 30 pounds per thousand bushels.

EDGAR V. O'DANIEL.